(12) United States Patent
Di Nunzio

(10) Patent No.: US 7,487,797 B2
(45) Date of Patent: Feb. 10, 2009

(54) 4 PORT FLUID CARTRIDGE

(76) Inventor: David Di Nunzio, 9314 Lake shore Blvd., Mentor, OH (US) 44060

( * ) Notice: Subject to any disclaimer, the term of this patent is extended or adjusted under 35 U.S.C. 154(b) by 285 days.

(21) Appl. No.: 11/341,349

(22) Filed: Jan. 26, 2006

(65) Prior Publication Data

US 2006/0162793 A1   Jul. 27, 2006

Related U.S. Application Data

(60) Provisional application No. 60/647,252, filed on Jan. 26, 2005.

(51) Int. Cl.
*F16K 11/078* (2006.01)
(52) U.S. Cl. .............................. 137/625.18; 137/625.17
(58) Field of Classification Search ............ 137/625.17, 137/625.18, 625.4, 625.41
See application file for complete search history.

(56) References Cited

U.S. PATENT DOCUMENTS

| | | | | |
|---|---|---|---|---|
| 3,433,264 A | * | 3/1969 | Parkison | ................ 137/625.17 |
| 4,705,074 A | * | 11/1987 | Olsson et al. | .......... 137/625.46 |
| 4,706,709 A | * | 11/1987 | Monch | ........................ 137/597 |
| 4,794,952 A | * | 1/1989 | Burkard | ...................... 137/597 |
| 4,960,154 A | * | 10/1990 | Dagiantis | ................ 137/625.17 |
| 6,959,731 B2 | * | 11/2005 | Bartkus et al. | ......... 137/625.46 |

\* cited by examiner

*Primary Examiner*—John Fox

(57) ABSTRACT

A control disk insert for a one lever mixer valve (20) contains two preferably, planar disks, whereof one fixed control disk (24) has at least one opening zone for hot water and at least one opening zone for cold water. The movable control disk (22) facing the fixed control disk (24) and movable with two degrees of freedom can both completely close and continuously completely open the opening zones in the fixed control disk (24). The opening zones of the fixed control disk (24) and the opening zones of the moveable control disk (22) are constructed in such a way that the control disk (22) can be positioned to divert a non-contaminated fluid stream to a separate outlet for connection to various devices. Or, the opening zones of the fixed control disk (24) and the opening zones of the moveable control disk (22) are constructed in such a way that the control disk (22) can be positioned to send a pressure signal or pressure relief signal to an appliance.

7 Claims, 5 Drawing Sheets

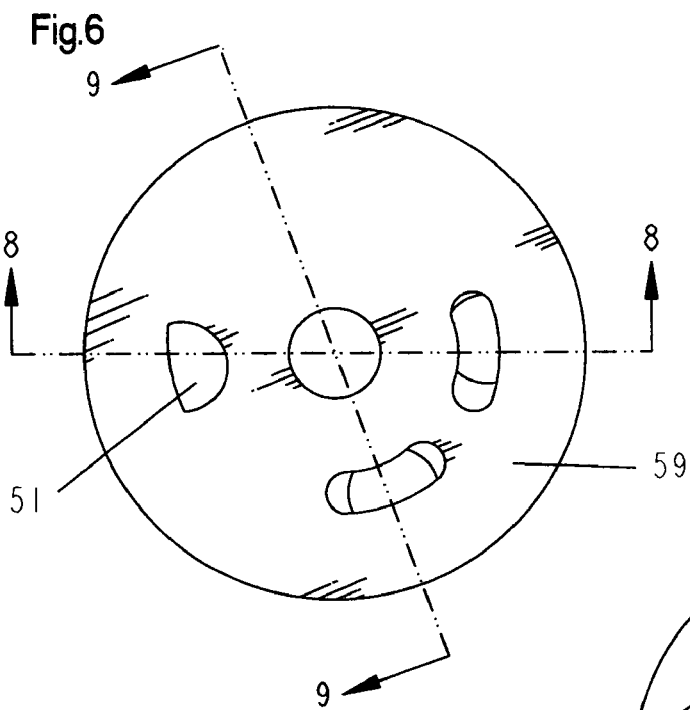
Fig.6
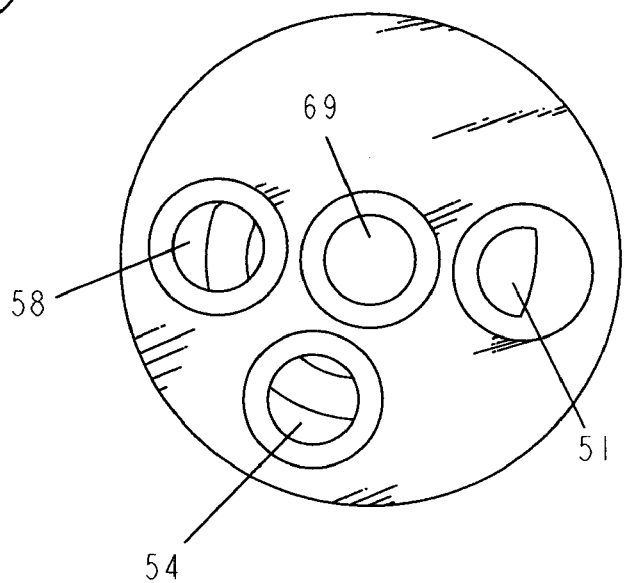
Fig.7
Fig.8
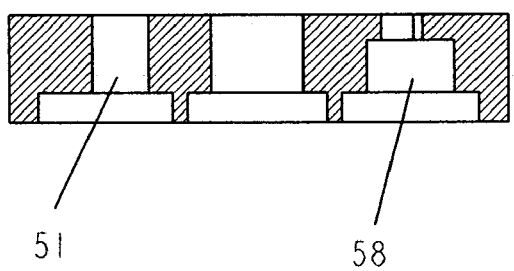
Fig.9
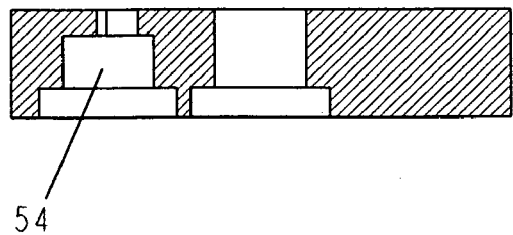

4 PORT FLUID CARTRIDGE

CROSS-REFERENCE TO RELATED APPLICATIONS

This application claims the benefit of provisional patent application Ser. No. 60/647,252 filed Jan. 26, 2005 by the present inventor.

FEDERALLY SPONSORED RESEARCH

Not Applicable

SEQUENCE LISTING OR PROGRAM

Not Applicable

BACKGROUND OF THE INVENTION

1. Field of the Invention

This invention relates to faucets which control the mixing of hot and cold water. More particularly, the invention relates to faucets of the foregoing type wherein a movable disk is both rotated and directed in a linear manner over a stationary disk by an operating spindle. In addition, the invention relates to a cartridge with at least one additional port which can be used for various applications.

2. Prior Art

There are problems with certain mixing valves which utilize movable and stationary disks (e.g. ceramic disks) in applications which relate to the use of water filtration systems. Prior art arrangements of these faucets and four port mixing valves (e.g. cartridges) appear to suffer from common disadvantages such as (a) cartridges are bulky and large. (b) cartridges require additional space and are specific to one unique application. (c) cartridges require numerous additional components. (d) they are more expensive to manufacture due to larger exterior components. (e) cartridges have small flow area at control surface interface of the additional filtration water communication port. (f) cartridges have rotatable activation at faucet handle. Control surface refers to where a movable control disk and a fixed control disk form a seal plane for mixing.

Also, alternate cartridge designs that are used for water filtration applications require 5 port cartridges. Such a cartridge is described in U.S. Pat. No. 6,029,699 by Yoav Granot. The aforementioned patent employs small overlap area at the control surface interface of the diverting opening. Also, the large 5 port cartridge activates filter water mode by handle rotation, which is perhaps less than an intuitive approach.

Other large and bulky cartridge designs do activate filter water by pushing downwards on a faucet handle as in U.S. Pat. No. 6,135,151 by David L. Bowers et al. While this cartridge design has the convenience of downward activation, and the cartridge requires one less flow line when compared to the cartridge described in U.S. Pat. No. 6,029,699 by Yoav Granot, the cartridge is complex, bulky and can only be used on very specific valve seats.

Furthermore, The cartridge described in U.S. Pat. No. 6,135,151 by David L. Bowers et al defines disk members having defined therebetween a mixing chamber and a diverting cavity. Such arrangements result in limiting surface area for the overlapping cavity and results in more geometry restrictions on the underside of such movable control disks.

3. Objects and Advantages

Accordingly, several objects and advantages of the present invention are:

(a) to provide a cartridge with a downward activation with reference to the faucet handle and a diverting fluid stream
(b) to provide a 4 port cartridge that can be used in filtration applications
(c) to provide a more conventional shaped 4 port cartridge
(d) to provide a 4 port cartridge requires a few additional components when compared to existing 3 port cartridges that are quite common
(e) to provide a cartridge that can be used to send water to a displacement type chiller that dispenses chilled, filtered or unfiltered cold water
(f) to provide a cartridge that can send a momentary or long duration pressure signal to control an appliance or mechanism
(g) to provide a cartridge that can vent a pressure buildup in order to control an appliance or mechanism Further objects and advantages are to provide a compact cartridge that may be suitable for applications that dispense hot or chilled water in kitchens.

SUMMARY

The invention can be used in applications where the dispensing of filtered water is desired. The newly invented cartridge requires few additional parts when compared to typical 3 port cartridges. Such an invention would be well suited for the dispensing of Hot water by means of a displacement type heated water chamber similar to that of a commercial coffee-maker. Or, a similar displacement device could be used to chill water. Furthermore, both devices could be located in modern or gourmet kitchens where the dispensing of heated cooking water and chilled water are desired. In addition, the use of such a device to control appliances by way of a pressure signal communicated by the cartridge may be desirable.

DRAWINGS—FIGURES

The invention is described in greater detail hereinafter relative to non-limitative embodiments and the attached drawings, wherein:

FIG. 6 is a top view of the fixed control disk e.g. the fixed control surface

FIG. 7 is a bottom view of the fixed control disk

FIG. 8 is a cross-section through the fixed control disk according to FIG. 6

FIG. 9 is a cross-section through the fixed control disk according to FIG. 6

Figure 1:
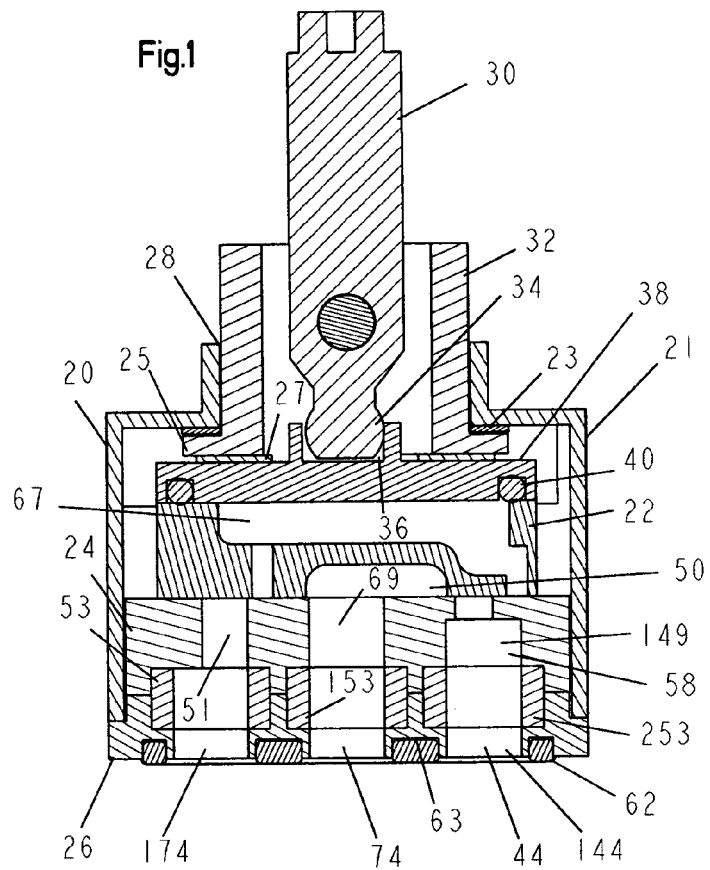
FIG. 1 is a cross-section through part of a mixer valve with a control insert according to the invention.

DRAWINGS—REFERENCE NUMERALS 20 cartridge
21 cartridge housing
22 movable control disk
23 bearing surface 24 fixed control disk
25 flange
26 valve seat
27 bearing surface
28 cavity
29 limit locus
30 rotative control rod device
32 cover seat
34 attachment
36 cavity
38 motion transmission element
40 o-ring
41 protrusion feature
42 protrusion feature
43 void
44 inlet cavity
45 void
46 inlet cavity
48 overpass chamber
50 mixing chamber
51 diverting outlet
53 seal
54 hot water inlet
58 cold water inlet
59 upper limit surface
60A seal slot
60B seal slot
60C seal slot
60D seal slot
61 moveable control surface
62 seal
63 seal slot
64 opening
66 opening
67 diverting chamber
68 opening
69 outlet
74 outlet
153 seal
144 outlet
145 inlet
148 inlet
174 inlet
253 seal
353 seal

DETAILED DESCRIPTION—PREFERRED EMBODIMENT

Figure 2:
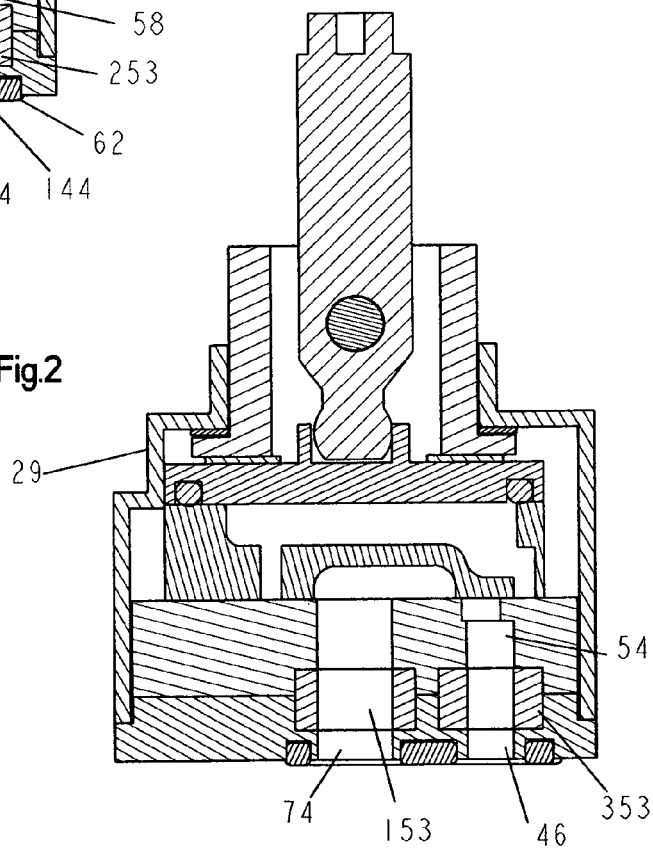
FIG. 2 is a cross-section from a direction turned 80° relative to FIG. 1 with the control rod rotated respectively.
Figure 15:
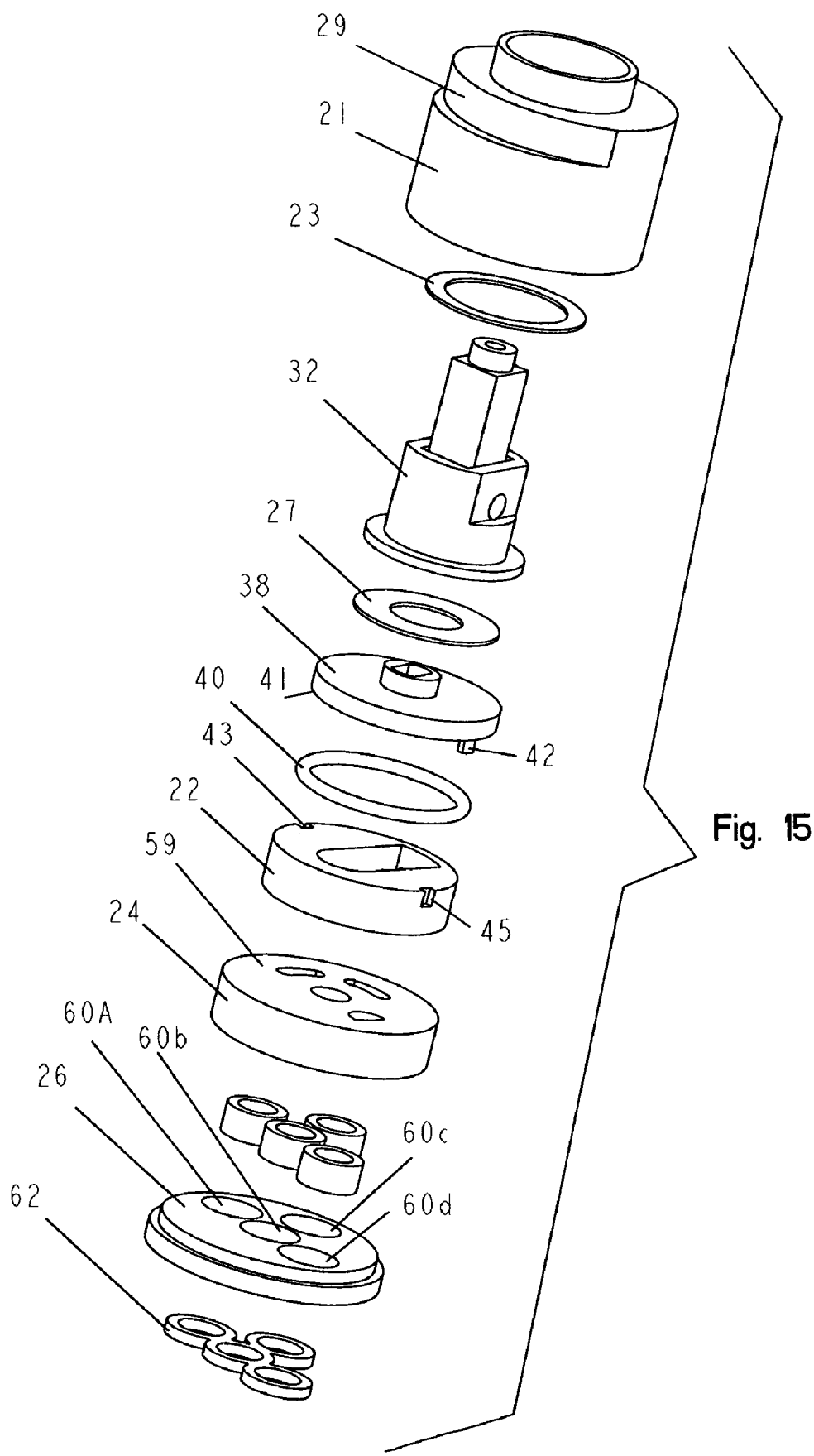
FIG. 15 is an exploded view of the valve of FIG. 1.

Referring to the attached drawings FIG. 1 and FIG. 2, the present invention generally includes a cartridge 20, a movable control disk 22, a fixed control disk 24, and a valve seat 26. A bearing surface 23 is located above a flange 25. A cartridge housing 21 is cylindrical, on the top. there is a cavity 28 of a smaller diameter. A rotative control rod device 30 is inserted in the cavity 28. The control rod 30 swings through the central axis of a cover seat 32, and includes an attachment 34. The control rod 30 extends down and continuous in an attachment 34 from a cover seat 32. The attachment 34 is placed in a corresponding cavity 36. The cavity 36 is located in an upper portion of a motion transmission element 38. A bearing surface 27 is located above transmission element 38. The transmission element 38 provides a range of motion for the control rod 30. An, O-ring 40 is beneath the transmission element 38 where said O-ring 40 seals transmission element 38 with the movable control disk 22. The transmission element 38 is equipped with protrusion features 41 and 42 extending downward into voids 43 and 45 securing control disk 22 as illustrated in FIG. 15. There are also two inlet cavities 44, 46 and two outlet cavities 74 and 174 as illustrated in FIGS. 1 and 2.

Referring to the FIGS. 1 to 5, the moveable control disk 22 is a smaller diameter than the aforesaid cartridge 20. There is an overpass chamber 67 in the upper portion of the movable disk 22. The transmission element 38 has protrusions 41 and 42 that can be inserted into voids 43, 45 in the moveable control disk 22. In addition, an o-ring 40 seals the moveable control disk 22 with the transmission element 38.

Together, these items are to be mounted in the cartridge 20 while moving freely relative to the fixed disk 24. The moveable disk is free to move within the confines of the cartridge housing 21 with a notable difference from existing cartridges defined by inner cartridge housing 21 geometry limit locus 29. Also, there is a mixing chamber 50 in the movable disk 22. The mixing chamber 50 can be connected to hot water inlet 54 and cold water inlet 58 in the fixed control disk.

Figure 3:
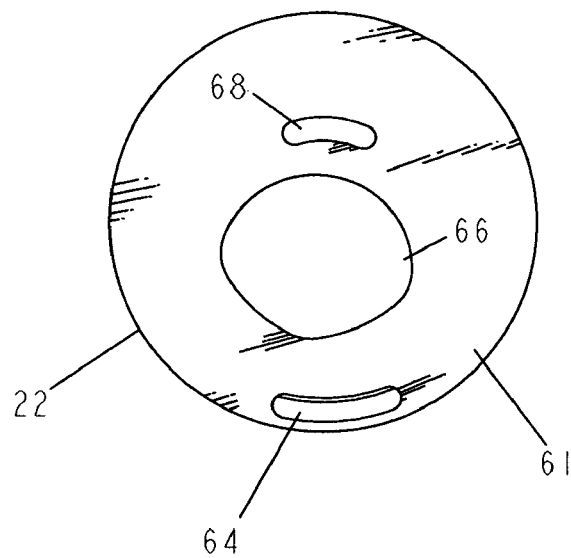
FIG. 3 is a bottom view of the moveable control disk e.g. the moveable control surface
Figure 4:
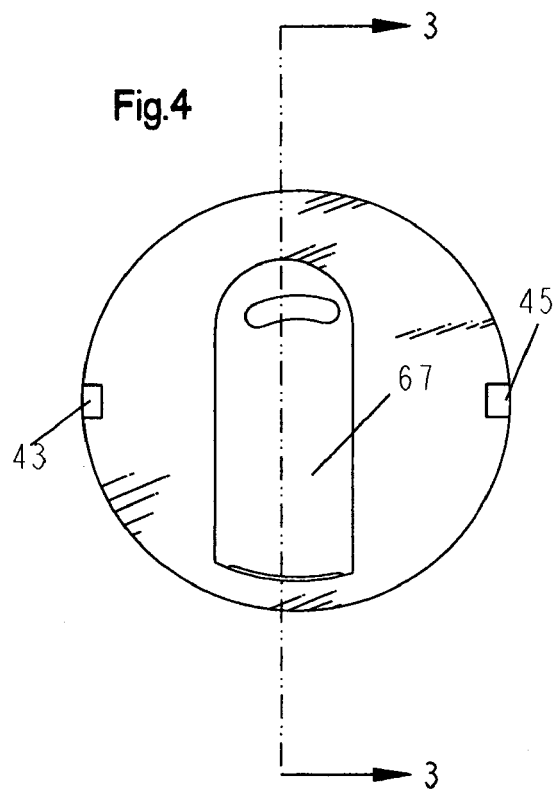
FIG. 4 is a top view of the moveable control disk
Figure 5:
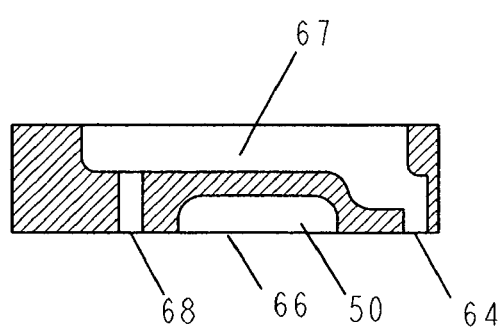
FIG. 5 is a cross-section through the moveable control disk according to FIG. 4

A valve seat 26 inserts and engages at bottom of the cartridge 20 and positions the seals 53, 153, 253 and 353 interfacing the fixed disk 24. The moveable disk 22 is subjected to the movement of the control rod 30 and is able to move and overlap the fixed disk 24. The control rod 30 drives the moveable disk 22 and alters various positions of the moveable disk 22 in relation to the fixed disk 24 (see FIGS. 10 to 14). The movable control disk has a lower limit surface that forms the movable control surface 61 as illustrated in FIG. 3. To provide for outlet 74 water flow, the movable control disk opening 66 connects to hot water inlet 54, cold water inlet 58, or a combination of both water inlets. All mixed water exits the fixed control disk 24 through outlet 69. By way of the aforementioned connections, the movable control disk 22 is able to open or close or mix or deliver hot and cold water to outlet 74.

See FIGS. 1, 2, 6, 7 and 15. Below the movable control disk 22, the fixed control disk 24 is secured in the cartridge by the position of the seals 53, 153, 253 and 353 only for the purpose of this example. The fixed disk will utilize common means for securing the fixed control disk in position. Common means refers to voids along a peripheral edge in a lower surface of a fixed control disk which engage securing protrusions located in a valve seat. The fixed control disk 24 has an upper limit surface 59 which forms the fixed control surface. The fixed control disk 24 has hot and cold inlet 54 and 58 that receive flow from inlet cavities 46 and 44. The only diagrammatically represented fixed control disk 24 rest partly on the seals 53, 153, 253 and 353 and valve seat 26. In FIGS. 6 to 8, the fixed disk 24 contains a diverting outlet 51. The diverting outlet 51 is diametrically opposed to the cold water inlet 58.

In FIG. 15 you can see seal slots 60A, 60B, 60C, and 60D in the valve seat 26. A seal 62 covers seal slot 63 in order to prevent leakage between valve seat and all inlets and outlets. In doing so, all individual fluid paths are also sealed from each other as is accomplished by individual seals 53, 153, 253 and 353.

It is common practice to use a flat surface of two disks to form a seal plane by placing what we call control surfaces against each other to form a seal plain. In order to be clear, the term opening zone in a control surface means an opening in a control surface where an edge of said opening zone does not share an edge with a perimeter or boundary of said control surface.

Figure 10:
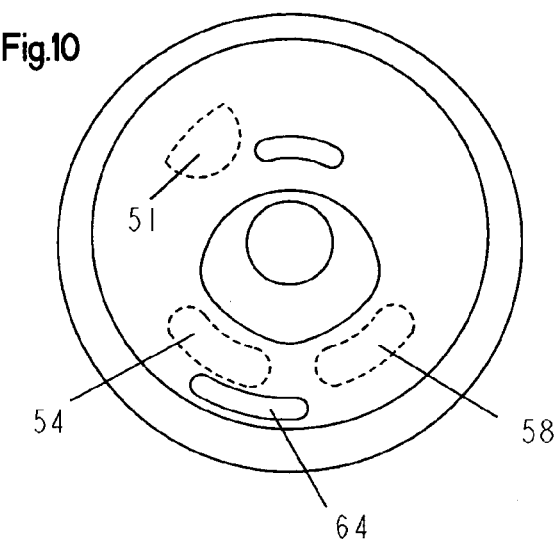
FIGS. 10 to 14 are diagrammatically positions of fixed and movable control disks.
Figure 11:
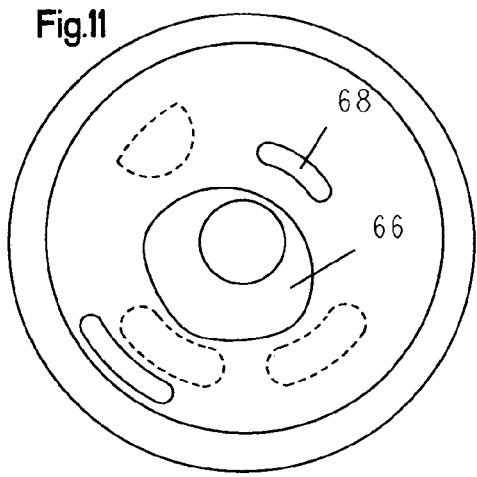
Figure 12:
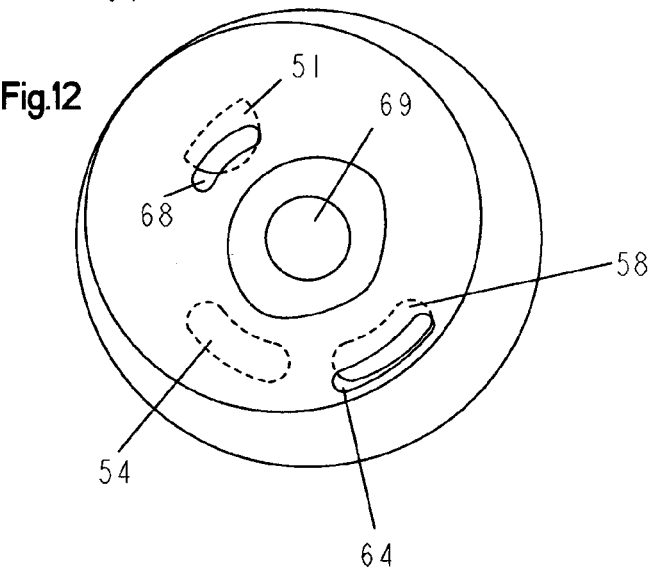
Figure 13:
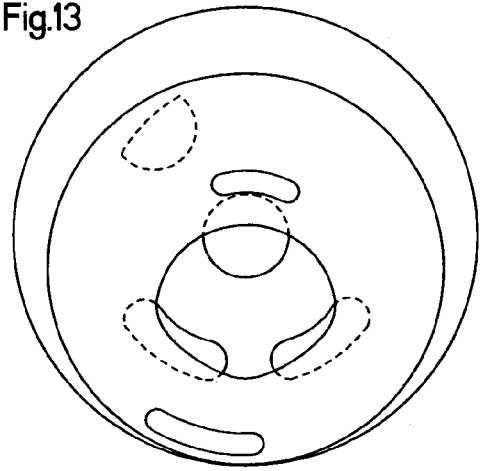
Figure 14:
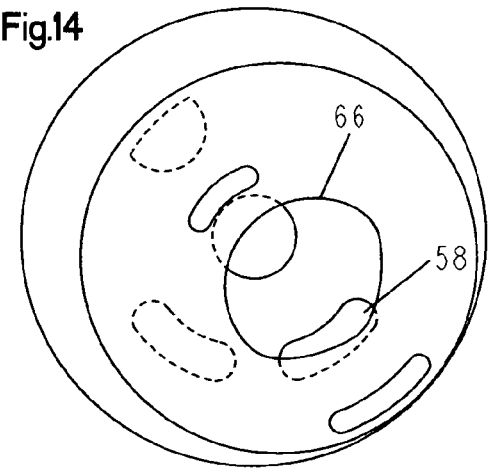

With reference to FIG. 4, and FIGS. 10 to 14, the interactions of the two control disks for mixing the two water flows and for setting the water quantity will now be described. A rotation of the movable control disk 22 leads to a temperature change, whilst a displacement of the movable control disk in a direction of an alignment passing through the center of the section 3 line in FIG. 4 permits the choice of the water quantity. In FIG. 12 the control disk is rotated counter clockwise to its end position and is simultaneously displaced to the left and upwards. The opening 64 of moveable control disk 22 frees the cold water inlet 58 of the fixed control disk 24, which is to be connected with the cold water. Simultaneously, the opening 68 of moveable control disk 22 frees opening 51 in the fixed control disk, which is also connected to the cold water inlet. The water enters opening 64 and travels through a diverting channel 67. The position of FIG. 12 consequently means that the cartridge is in the diverting position and is sending water or sending a pressure signal to a water filter or alternate device. If the control disk 22 is now positioned downward to the right, then the situation is as shown in FIG. 14. Opening 66 frees opening 58 in the fixed control disk and allows the water to exit through outlet 69. Thus, FIG. 14 shows the control insert in the cold water position.

If the control disk 22 is now positioned downward to the left, then the situation is as shown in FIG. 13. To an equal extent opening 66 frees the openings 54 and 58.

Thus, FIG. 13 shows the control insert position with a 50% mixing ratio.

If the moveable control disk 22 is moved upwards from the position in FIG. 13 without turning it, the position shown in FIG. 10 is obtained, in which the valve is closed in the central temperature position. In this closed position, control disk 22 can be rotated both clockwise and counterclockwise without the valve opening. In FIG. 11, the off position of the full hot orientation is displayed.

Alternative Embodiments

There may be applications where a compact cartridge is able to channel hot or cold water to a another location. FIG. 1 can also be a section through the hot water inlet 54 & outlet 74. Such a 5 port unit could have the fifth port diametrically opposed to the hot water inlet 144 that can utilize the diverting channel 67 in order to connect to a second diverting out port 174. Using FIG. 1 to replace the hot water cross section of FIG. 2 is the simplest way to describe what a section that is 80 degrees away from the cold water position of FIG. 1 would look like. A cartridge built without limit locus 29 being completely circular cross sectioned cartridge could allow for the dispensing of either stream or a mix of both streams. In the event that a mixing of both diverting streams is undesirable, a smaller limit locus or a groove in limit locus can facilitate downward activation occurring in only non-mixing positions.

The newly invented cartridge could easily have the translation or volume controlling throw positions divided into two index-able positions to allow for a user interface that provides response feel to the user when pressing handle down. Part of the response throw could be momentary and then transition into a fixed position of outflow. This can be accomplished by use of indents with corresponding cavities located in the lever and interfacing parts. Use of a spring or incorporating geometry into a memory retaining polymer would suffice for such an application.

In addition, the cartridge 20 can be seated on a surface that allows for, the first one of two diverting positions to be active, the second of two diverting positions to be active or both diverting positions to be active.

Also, the cartridge can be used with one of the diverting ports functioning as a vent. This may be useful in applications where a filter unit can be relieved of pressure so as to change the filter unit. Similarly, one of the diverting chambers can be used to connect a vent to an appliance that builds pressure in a line where the relief of such pressure causes a desired functioning to occur. Such a device could be used to flush a toilet and promote good hygiene practices. In such an application, the movement of the faucet handle to wash ones hands could automatically flush a toilet.

Additionally, the cartridge can be constructed using similar protrusion notches or pawls to secure and balance the fixed control disk to the valve seat as is done in current cartridge designs. Furthermore, the cartridge can be constructed using similar snap locking features that are currently used to secure the cartridge outer shell to the valve seat.

Similarly, the cartridge can be constructed similar to existing 3 port cartridges requiring few additional parts. From an appearance standpoint, the main differences distinguishing this invention from other cartridges are related to the geometry of the control disks.

When the invention is compared to other similar four or five port cartridges, the simplicity and therefor lower cost is desirable.

When the alternate flow area overlap in the control surface of the newly invented cartridge is compared to other 4 or 5 port cartridges, the sound and performance may be more desirable.

Although the description above contains many specificities, these should not be construed as limiting the scope of the invention but as merely providing illustrations of some of the presently preferred embodiments of this invention.

Thus the scope of the invention should be determined by the appended claims and their legal equivalents, rather than by examples given.

Advantages

The numerous advantages in the aforementioned items generally relate to diverting flow area, size, cost and versatility. The newly invented cartridge can be used in many different applications. Also, the cartridge can be used in applications where a cheaper alternative cartridge is desired. There may be numerous applications for which this cartridge may be preferred over the prior art.

It is noteworthy to mention that such a cartridge can have numerous common parts with other similar cartridges so as to reduce the number of custom parts that are unique only to a 4 or 5 port application.

I claim:

1. A sanitary mixer valve used in combination with a water filtration device, the sanitary mixer valve having a fixed control disk connectable to water inlet ports of the valve, the fixed control disk having one inlet for cold water, one inlet for hot water and a first outlet of at least two outlets that is connectable to a mixing chamber, a movable control disk having a movable control surface having at least three opening zones mechanically coupled and movable with respect to a fixed control surface with two degrees of freedom, a mixer lever attached to the movable control surface for controlling quantity and mixing ratio between opening zones as a function of position, wherein:
   the movable control surface having a first opening zone functioning as the mixing chamber as a function of position, a second opening zone connecting to a third opening zone where at least part of the connection from the second opening zone to the third opening zone passes through the moveable control disk and said second and third opening zones are not in communication with the mixing chamber.

2. A valve according to claim 1, wherein said third opening zone can connect to a second outlet of the at least two fixed control disk outlets as a function of position where the second opening zone in the moveable control disk simultaneously allows a fluid stream to pass through, where said fixed control disk second outlet is not connectable to the mixing chamber outlet.

3. A valve according to claim 1, wherein a flow path of the second opening zone to the third opening zone is separated from a mixing chamber by a sealed region.

4. A valve according to claim 1, wherein the second opening zone in the moveable control surface is in communication with the third opening zone in the moveable control surface, where said communication occurs at mechanically sealed area of an opposing side of the movable control disk.

5. A valve according to claim 1, wherein the movable control disk having the control surface on one side of the movable control disk has an opposing side where the mixing chamber is contained by a mechanically sealed area, and a flow path that leads from the second opening zone to the third opening zone is also mechanically sealed on the opposing side or along a peripheral zone.

6. A valve according to claim 1, wherein the movable control disk having the control surface on one side and two through holes emanating from the second and third opening zone in the moveable control surface and as a function of position, at least one through hole functions as an inlet and at least one through hole functions as an outlet, both said through holes are in communication with each other at the opposing side of the movable control surface through an open path and are contained by a mechanical seal.

7. A sanitary mixer valve according to claim 1, wherein the fixed control disk has a diverting opening that is diametrically opposed to the inlet that is being diverted.

* * * * *